(12) United States Patent
Konita

(10) Patent No.: US 11,531,774 B2
(45) Date of Patent: Dec. 20, 2022

(54) INFORMATION PROCESSING APPARATUS AND NON-TRANSITORY COMPUTER READABLE MEDIUM STORING INFORMATION PROCESSING PROGRAM

(71) Applicant: FUJIFILM BUSINESS INNOVATION CORP., Tokyo (JP)

(72) Inventor: Naoya Konita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 489 days.

(21) Appl. No.: 15/912,836

(22) Filed: Mar. 6, 2018

(65) Prior Publication Data

US 2019/0034649 A1 Jan. 31, 2019

(30) Foreign Application Priority Data

Jul. 28, 2017 (JP) .............................. JP2017-146011

(51) Int. Cl.
*G06F 21/60* (2013.01)
*G06F 21/62* (2013.01)

(52) U.S. Cl.
CPC .......... *G06F 21/604* (2013.01); *G06F 21/608* (2013.01); *G06F 21/6218* (2013.01)

(58) Field of Classification Search
CPC ... G06F 21/604; G06F 21/608; G06F 21/6218
USPC .......................................................... 726/28
See application file for complete search history.

(56) References Cited

U.S. PATENT DOCUMENTS

| | | | |
|---|---|---|---|
| 8,201,224 B1 * | 6/2012 | Spertus | G06F 21/6218 726/4 |
| 8,464,161 B2 * | 6/2013 | Giles | G06F 21/604 715/751 |
| 8,547,570 B2 | 10/2013 | Shigeeda | |
| 10,237,304 B1 * | 3/2019 | Sokolov | G06F 3/011 |
| 2004/0177270 A1 * | 9/2004 | Little | G06F 21/64 713/166 |
| 2006/0136616 A1 * | 6/2006 | Kubota | G06F 21/608 710/36 |
| 2009/0207053 A1 * | 8/2009 | Lee | G06F 3/04883 341/22 |
| 2011/0125509 A1 * | 5/2011 | Lidstrom | G06Q 30/02 705/1.1 |
| 2011/0258697 A1 * | 10/2011 | Ikeda | G06F 21/31 726/16 |

(Continued)

FOREIGN PATENT DOCUMENTS

| | | |
|---|---|---|
| JP | 2007-164655 A | 6/2007 |
| JP | 2007-201638 A | 8/2007 |

(Continued)

OTHER PUBLICATIONS

Tian, "SmartAuth: User-Centered Authorization for Internet of Things", 2017, USENIX, pp. 361-378 (Year: 2017).*

(Continued)

*Primary Examiner* — Taghi T Arani
*Assistant Examiner* — Gregory A Lane
(74) *Attorney, Agent, or Firm* — Oliff PLC

(57) ABSTRACT

An information processing apparatus includes a detection unit that detects a degree of inconvenience to a user who is a target of authority setting, and a setting unit that sets an authority of the user in accordance with the degree of inconvenience.

13 Claims, 10 Drawing Sheets

(56) References Cited

U.S. PATENT DOCUMENTS

| | | | | |
|---|---|---|---|---|
| 2012/0136499 A1* | 5/2012 | Jang | ..................... | G06Q 50/06 |
| | | | | 700/297 |
| 2015/0089455 A1* | 3/2015 | Yamada | ................. | G06F 3/014 |
| | | | | 715/863 |
| 2016/0188895 A1* | 6/2016 | Liu | .................... | G06F 21/6218 |
| | | | | 726/17 |
| 2016/0352752 A1* | 12/2016 | Bush | .................... | H04L 63/105 |

FOREIGN PATENT DOCUMENTS

| | | |
|---|---|---|
| JP | 2010-201814 A | 9/2010 |
| JP | 2011-030043 A | 2/2011 |

OTHER PUBLICATIONS

Apr. 6, 2021 Office Action issued in Japanese Patent Application No. 2017-146011.

\* cited by examiner

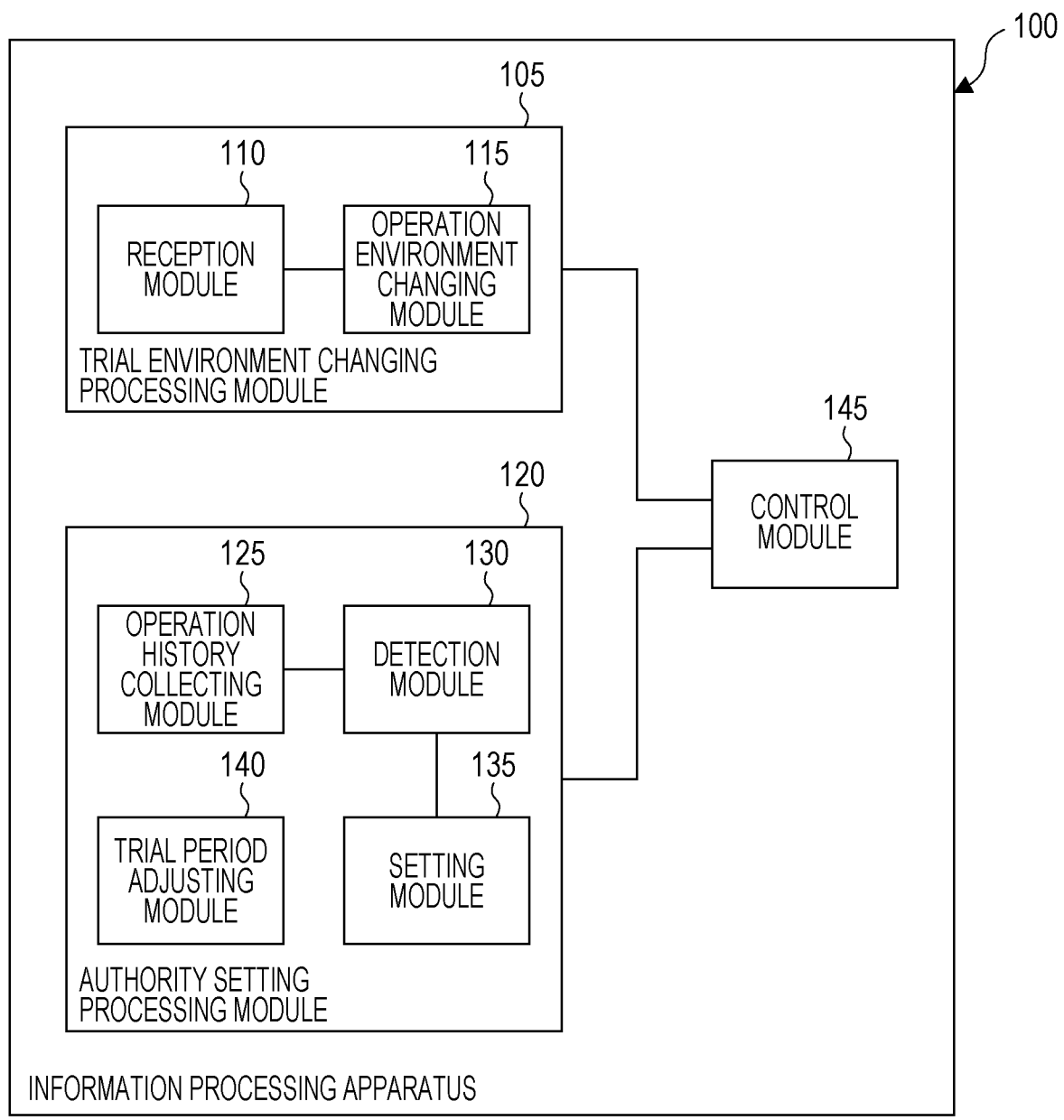

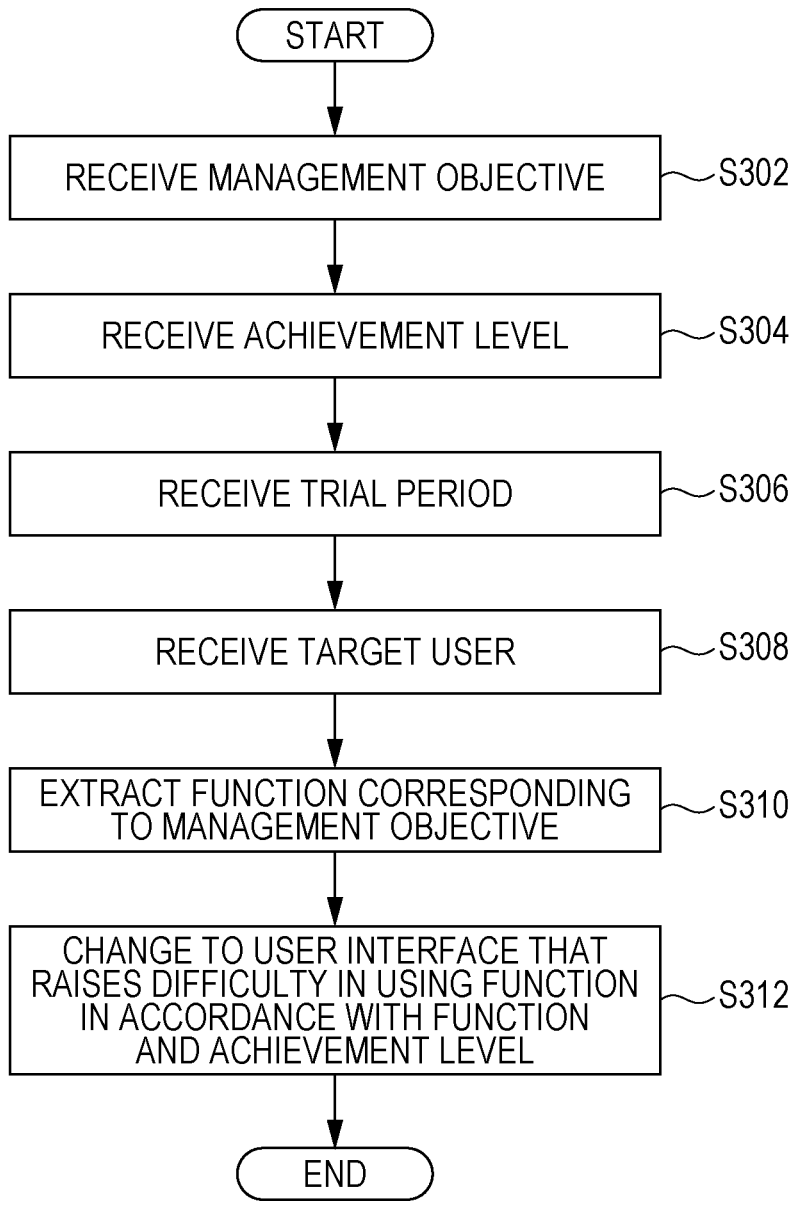

FIG. 4

| MANAGEMENT OBJECTIVE | FUNCTION |
|---|---|
| REDUCTION OF SHEETS | MULTIPLE-PAGES COLLECTIVE PRINTING FUNCTION |
| REDUCTION OF COLOR PRINTING | COLOR/MONOCHROME PRINTING SETTING FUNCTION |
| REDUCTION OF STAPLES | STAPLING FUNCTION |

FIG. 5

| FUNCTION | ACHIEVEMENT LEVEL | DEFAULT USER INTERFACE |
|---|---|---|
| MULTIPLE-PAGES COLLECTIVE PRINTING FUNCTION | HIGH-LEVEL REDUCTION | 8 PAGES PER SHEET |
| | MEDIUM-LEVEL REDUCTION | 4 PAGES PER SHEET |
| | LOW-LEVEL REDUCTION | 2 PAGES PER SHEET |
| STAPLING FUNCTION | — | MOVE 'STAPLING' TO BOTTOM OF MENU DISPLAY |
| | | MOVE 'STAPLING' TO 'OTHER SETTINGS' ITEM |

FIG. 9

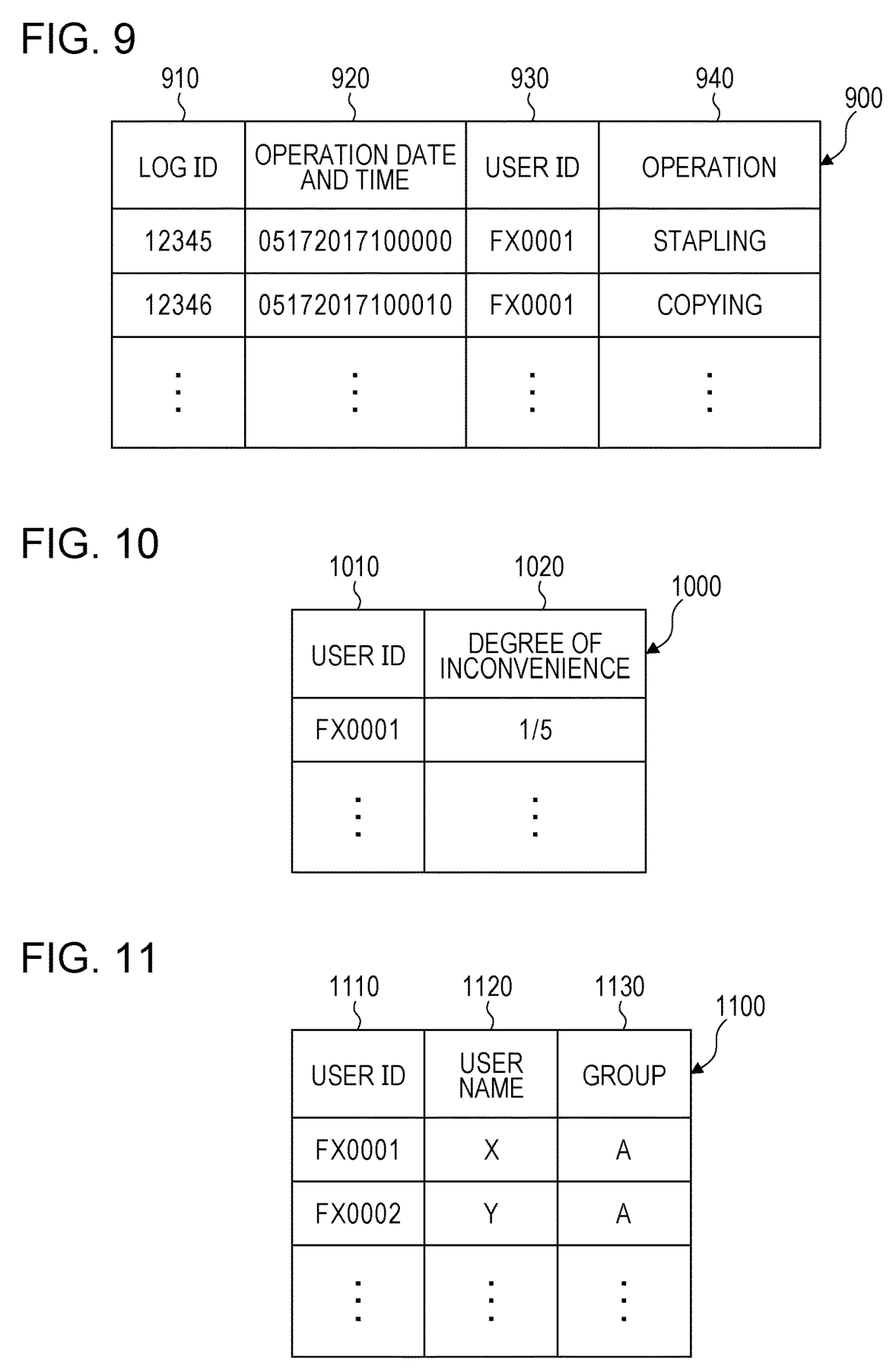

| LOG ID | OPERATION DATE AND TIME | USER ID | OPERATION |
|---|---|---|---|
| 12345 | 05172017100000 | FX0001 | STAPLING |
| 12346 | 05172017100010 | FX0001 | COPYING |
| ⋮ | ⋮ | ⋮ | ⋮ |

FIG. 10

| USER ID | DEGREE OF INCONVENIENCE |
|---|---|
| FX0001 | 1/5 |
| ⋮ | ⋮ |

FIG. 11

| USER ID | USER NAME | GROUP |
|---|---|---|
| FX0001 | X | A |
| FX0002 | Y | A |
| ⋮ | ⋮ | ⋮ |

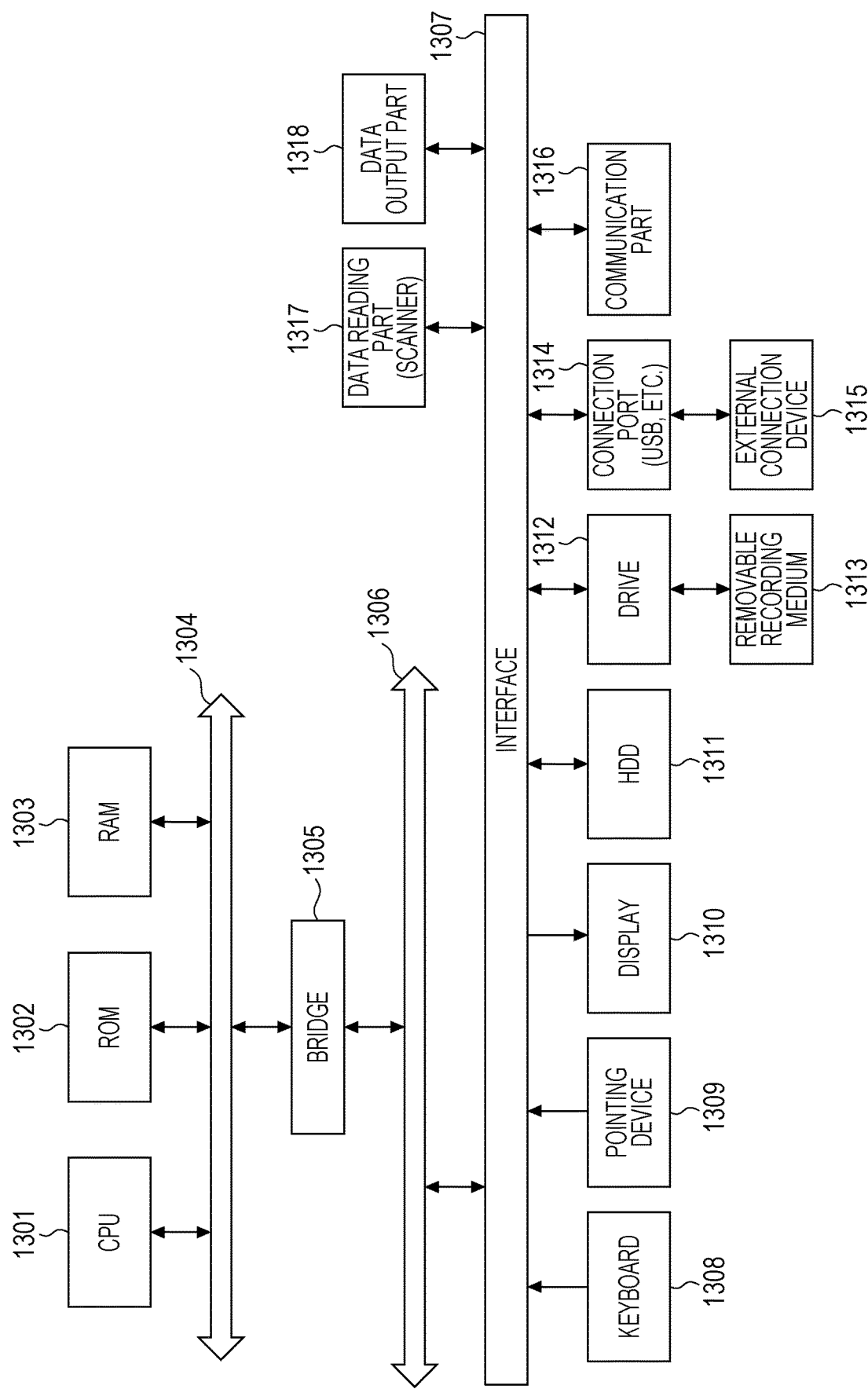

INFORMATION PROCESSING APPARATUS AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2017-146011 filed Jul. 28, 2017.

BACKGROUND

Technical Field

The present invention relates to an information processing apparatus and a non-transitory computer readable medium storing an information processing program.

SUMMARY

According to an aspect of the invention, there is provided an information processing apparatus including a detection unit that detects a degree of inconvenience to a user who is a target of authority setting, and a setting unit that sets an authority of the user in accordance with the degree of inconvenience.

BRIEF DESCRIPTION OF THE DRAWINGS

An exemplary embodiment of the present invention will be described in detail based on the following figures, wherein:

FIG. 1 schematically illustrates the configuration of modules as an example of the configuration of this exemplary embodiment;

FIG. 3 is a flowchart illustrating an example of processing according to this exemplary embodiment;

FIG. 4 illustrates an example of the data structure of a management objective-function correspondence table;

FIG. 5 illustrates an example of the data structure of a trial-period user interface table;

FIG. 9 illustrates an example of the data structure of an operation history table;

FIG. 10 illustrates an example of the data structure of an inconvenience degree table;

FIG. 11 illustrates an example of the data structure of a user table;

FIG. 13 is a block diagram illustrating an example of the hardware configuration of a computer that implements this exemplary embodiment.

DETAILED DESCRIPTION

Figure 2A:
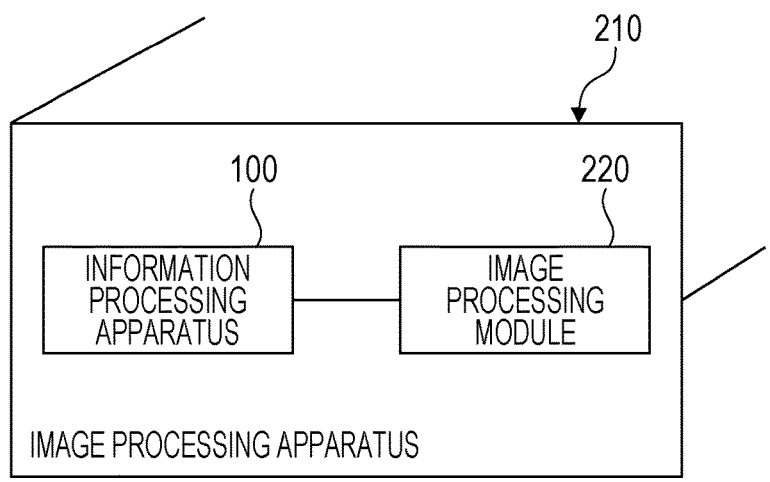
FIGS. 2A and 2B illustrate examples of the system configuration that utilizes this exemplary embodiment.

Prior to description of this exemplary embodiment, a technology serving as a basis for this exemplary embodiment is described. This description is made to facilitate understanding of this exemplary embodiment.

Recent multifunction peripherals have various functions. There is a desire to limit users who are allowed to use those functions from the viewpoint of security, printing cost, or the like. As a measure to meet the desire, there is known a technology capable of managing information on authorities to use the functions for the respective users or groups.

It takes a great deal of time and effort for an administrator to appropriately set the information on use authorities. A technology described in Japanese Unexamined Patent Application Publication No. 2007-201638 is a technology that addresses this issue.

With the technology described in Japanese Unexamined Patent Application Publication No. 2007-201638, in an image processing system in which a control device manages access control for functions of each image processing apparatus, the control device may automatically set information on access control for an image processing apparatus when newly installed. That is, there is no need for the administrator to manually set authorities in view of the type and functions of a multifunction peripheral when initially installed.

In the technology described in Japanese Unexamined Patent Application Publication No. 2007-201638, the following troubles may occur. (1) Users' tasks may be hindered by the limitation on functions based on authorities. Even if any task is hindered, the administrator hardly knows that situation unless the user directly reports the situation, for example. (2) Users' tasks may be changed and the required authorities may also be changed. However, the authorities are not changeable along with the task change.

An exemplary embodiment of the present invention is described below with reference to the drawings.

FIG. 1 schematically illustrates the configuration of modules as an example of the configuration of this exemplary embodiment.

The term "module" generally refers to a logically separable component of software (computer program), hardware, or the like. Therefore, the module in this exemplary embodiment refers to not only a module in a computer program but also a module in a hardware configuration. Thus, this exemplary embodiment also serves as description of a computer program for implementing the module (a program for causing a computer to execute each procedure, a program for causing a computer to function as each unit, or a program for causing a computer to implement each function), a system, and a method. For convenience of description, the terms "store", "cause to store", and other equivalent terms are used. When the exemplary embodiment is directed to a computer program, those terms mean that an object is stored in a storage device or control is performed to store an object in a storage device. The module may have one-to-one correspondence with a function. In the implementation, one module may be configured by one program, multiple modules may be configured by one program, or one module may be configured by multiple programs. Multiple modules may be executed by one computer or one module may be executed by multiple computers in a distributed or parallel environment. One module may include any other module. The term "connection" is hereinafter used not only for physical connection but also for logical connection (such as data exchange, instructions, or data reference relationships). The term "predetermined" refers to a state that is determined before processing of interest. This term means any state that is determined not only before the start of processing of this exemplary embodiment but also after the start of processing of this exemplary embodiment depending on a current situation or condition or on a situation or condition thus far as long as the state is determined before processing of interest. When multiple "predetermined values" are present, the values may be different from each other or two or more values (including a case of all the values) may be equal to each other. The description "when A is true, B is conducted" means that "determination is made on whether A is true and B is conducted when A is true as a result of the determination". This description excludes a case where there is no need to determine whether A is true. Enumeration of matters in the form of, for example, "A, B, and C" is enumeration of examples unless otherwise noted and encompasses a case where one of the examples is selected alone (for example, only A).

The term "system" or "apparatus" not only encompasses configurations in which multiple computers, hardware configurations, apparatuses, or the like are connected by a communication medium such as a network (including connections that support one-to-one communications) but also encompasses configurations implemented by a single computer, hardware configuration, apparatus, or the like. The terms "apparatus" and "system" are used interchangeably. As a matter of course, the term "system" excludes a mere social "mechanism" (social system) that is organized by humans.

In each processing operation performed by a module or in each of multiple processing operations performed by a module, information to be processed is read from a storage device and a processing result obtained after the processing operation is written into the storage device. Thus, description may be omitted for the reading from the storage device before the processing operation and the writing into the storage device after the processing operation. The storage device herein encompasses hard disks, a random access memory (RAM), external storage media, storage devices connected via a communication network, and registers inside a central processing unit (CPU).

An information processing apparatus 100 according to this exemplary embodiment automatically sets user authorities. As illustrated in an example of FIG. 1, the information processing apparatus 100 includes a trial environment changing processing module 105, an authority setting processing module 120, and a control module 145. The trial is exemplified as in the case of the "trial environment" but this exemplary embodiment is not limited thereto as described later.

The information processing apparatus 100 achieves profit objectives of an organization (such as cost reduction and security risk reduction) while suppressing a decrease in user's task efficiency.

The information processing apparatus 100 according to this exemplary embodiment detects a function or setting necessary for a user based on the user's operation. The information processing apparatus 100 grasps a user's intention on the necessary function or setting by prediction. For example, the information processing apparatus 100 raises "burdensomeness (difficulty)" of a process of selecting the function or setting that is a target of necessity determination and predicts that the function or setting is necessary when the function or setting is selected despite the burdensomeness.

For example, regarding the function or setting that is the target of necessity determination, "an operation required before selection is made burdensome (for example, the number of steps is increased or a time is extended)". The necessity determination is made based on whether the user selects the setting in a different layer. There are provided an example in which the number of operation steps is increased (1) and an example in which a time required to enable a selecting operation is extended (2).

As the example in which the number of operation steps is increased (1-1), there may be provided a period in which the function or setting that is the target of necessity determination is arranged outside a screen. The necessity determination may be made based on whether the user selects the setting outside the screen.

As a specific example (1-1-1), there may be provided a period in which the function or setting that is the target of necessity determination is arranged "outside a scroll range (within the same page but outside a currently displayed area)". The necessity determination may be made based on whether the user selects the setting outside the screen.

As another specific example (1-1-2), there may be provided a period in which the function or setting that is the target of necessity determination is arranged "in a different page (not in the same page but outside a currently displayed area)". The necessity determination may be made based on whether the user selects the setting outside the screen.

As the example in which the number of operation steps is increased (1-2), there may be provided a period in which the function or setting that is the target of necessity determination is arranged in a different layer. The necessity determination may be made based on whether the user selects the setting in the different layer.

As a specific example (1-2-1), there may be provided a period in which the function or setting that is the target of necessity determination is arranged "in a folder". The necessity determination may be made based on whether the user selects the setting outside the screen.

As the example in which the time required to enable the selecting operation is extended (2-1), there may be provided a longer time required to enable the selection (or changing) of the setting that is the target of necessity determination. In this case, the other settings may be selected and started readily. The necessity determination may be made based on whether the user selects the setting despite the waiting time.

As a specific example (2-1-1), there may be provided a period in which a selection (or changing) indication for the setting that is the target of necessity determination is grayed out first and the grayed-out indication is terminated after an elapse of a predetermined time. In this case, the other settings may be selected and started readily. The necessity determination may be made based on whether the user selects the setting despite the waiting time.

For example, regarding the function or setting that is the target of necessity determination, "the selecting operation itself is made burdensome (for example, the number of steps is increased or a time is extended)". The necessity determination is made based on whether the user selects the setting in a different layer. There are provided an example in which the number of operation steps is increased (3) and an example in which a time required to enable the selecting operation is extended (4).

As the example in which the number of operation steps is increased (3-1), there may be provided a period in which "steps more than a normal step (one step) are required to select" the function or setting that is the target of necessity determination. The necessity determination may be made based on whether the user selects the setting outside the screen.

As a specific example (3-1-1), there may be provided a period in which the function or setting that is the target of necessity determination is "selected by double tapping". The necessity determination may be made based on whether the user selects the setting outside the screen.

As another specific example (3-1-2), there may be provided a period in which the selection of the function or setting that is the target of necessity determination is confirmed when "a confirmation screen is displayed and then an OK button is selected". The necessity determination may be made based on whether the user selects the setting outside the screen.

As the example in which the number of operation steps is increased (3-2), there may be provided a period in which "the selecting operation is different from a normal selecting operation" in the case of the function or setting that is the target of necessity determination. The necessity determination may be made based on whether the user selects the setting in a different layer.

As a specific example (3-2-1), there may be provided a period in which the function or setting that is the target of necessity determination is "selected while depressing a different button". For example, both of a shift button and a function button may be depressed. The necessity determination may be made based on whether the user selects the setting outside the screen.

As the example in which the time required to enable the selecting operation is extended (4-1), there may be provided a period in which "a longer time than in a normal case is required to select" the function or setting that is the target of necessity determination. The necessity determination may be made based on whether the user selects the setting in a different layer.

As a specific example (4-1-1), there may be provided a period in which the function or setting that is the target of necessity determination is "selected by long tapping". The necessity determination may be made based on whether the user selects the setting outside the screen.

As another specific example (4-1-2), there may be provided a period in which the function or setting that is the target of necessity determination is "selected by swiping (moving after tapping)". The necessity determination may be made based on whether the user selects the setting outside the screen.

The trial environment changing processing module 105 includes a reception module 110 and an operation environment changing module 115. The trial environment changing processing module 105 is connected to the control module 145. The trial environment changing processing module 105 changes a user interface in order to detect the degree of inconvenience to the user. Processing to be performed by the trial environment changing processing module 105 is described later with reference to FIG. 3 to FIG. 7C that illustrate detailed examples.

The reception module 110 is connected to the operation environment changing module 115. The reception module 110 receives an instruction from a user (for example, an administrator). Examples of the instruction to be received include a management objective, an achievement level, a period (hereinafter described taking a "trial period" as an example), and a target user. Specifically, an objective "reduction of sheets" is specified and any one of "high-level reduction", "medium-level reduction", and "low-level reduction" is specified as an achievement level indicating a desired degree of reduction.

The operation environment changing module 115 is connected to the reception module 110. The operation environment changing module 115 changes the user interface in accordance with the instruction received by the reception module 110. The "changing of the user interface" is performed in order that the use of a limited function may become a difficult operation. The "difficult operation" may be an operation that requires more operation steps to use the function or has a higher difficulty in finding an element corresponding to the function than in a state before the trial period. The "state before the trial period" refers to a state in which the function may be used before the trial period and generally refers to a state in which the function may be used normally (specifically, an initial state). The "element corresponding to the function" refers to an element that configurates the user interface and examples thereof include a button and a menu. The "difficult operation" is described later with reference to FIGS. 6A and 6B and FIGS. 7A to 7C that illustrate detailed examples.

For example, the operation environment changing module 115 extracts the limited function based on the management objective. Next, the operation environment changing module 115 identifies a portion to be changed in the user interface based on the function or the achievement level and changes the user interface for each user. Then, the operation environment changing module 115 sets the trial period of the changed user interface. The trial period may be changed by a trial period adjusting module 140.

For example, during the trial period, "monochrome" is specified as a default setting of a color copying mode before "color copying authority: disabled" is set. It is assumed that there is a user who frequently uses copying while changing the setting from "monochrome" to "color" in the trial period. When "color copying authority: disabled" is set for the user, it may be predicted that the task is hindered. Therefore, there is provided a trial period in which the use of the color copying function is a difficult operation before "color copying authority: disabled" is set. Then, a detection module 130 detects the degree of inconvenience to the user.

Examples of the "difficult operation" may additionally include an operation that "requires a longer time to enable the selecting operation". That is, the "difficult operation" may include an operation that "requires a longer time to enable the operation" in addition to the operation that "requires more operation steps".

For example, there may be provided a time required to enable the selection (or changing) of the setting that is the target of necessity determination. The other settings may be selected (that is, may be started) readily.

Thus, the necessity determination may be made based on whether the user selects the setting despite the waiting time.

Specifically, a button indication for selecting (or changing) the setting that is the target of necessity determination may be grayed out first and the grayed-out indication may be terminated after an elapse of a predetermined time. As a matter of course, the other settings may be selected readily. The term "graying out" is an indication that the operation is disabled. In general, the selection button is displayed in gray. When the user selects the setting despite the predetermined waiting time, it may be determined that the necessity is high. When the user performs a different operation without waiting for the predetermined time, it may be determined that the necessity is low.

The authority setting processing module 120 includes an operation history collecting module 125, the detection module 130, a setting module 135, and the trial period adjusting module 140. The authority setting processing module 120 is connected to the control module 145. The authority setting processing module 120 sets the authority of the user.

The operation history collecting module 125 is connected to the detection module 130. The operation history collecting module 125 collects an operation history during the trial period. During the trial period, the user is using the user interface changed by the trial environment changing processing module 105. This user interface is configured so that the use of the limited function becomes the difficult operation. Therefore, the operation history allows measurement of the degree of inconvenience to the user.

The detection module 130 is connected to the operation history collecting module 125 and the setting module 135. The detection module 130 detects the degree of inconvenience to the user who is a target of authority setting.

The detection module 130 may provide the trial period in which the use of the function limited by the setting module 135 is the difficult operation and may detect a high degree of inconvenience when the difficult operation is performed during the trial period. The "trial period" is a period for detecting the degree of inconvenience.

The setting module 135 is connected to the detection module 130. The setting module 135 sets the authority of the user in accordance with the degree of inconvenience detected by the detection module 130.

The setting module 135 may set the authority of the user after the trial period has expired.

The setting module 135 may set the authority of the user by setting the usability of the target function or by setting the user interface so that the use of the function becomes the difficult operation.

When the degree of inconvenience is low, the setting module 135 may set the authority of the user so that the use of the target function is disabled or becomes the difficult operation. Since "the degree of inconvenience is low", the limitation on the function is not a serious inconvenience to the user.

When the degree of inconvenience is high, the setting module 135 may avoid changing the authority of the user. Specifically, the "avoiding of changing of the authority of the user" refers to restoration of the state before the trial period.

When the detection module 130 fails to detect the degree of inconvenience and when the target achievement level is low, the setting module 135 may set the authority by using the degree of inconvenience to another user who belongs to the same organization as that of the user. Examples of the case in which "the detection module 130 fails to detect the degree of inconvenience" include a case in which the target function is not used and a case in which the degree of inconvenience has not reached a detectable level because of a low frequency of use.

When the detection module 130 fails to detect the degree of inconvenience and when the target achievement level is high, the setting module 135 may set the authority assuming that the degree of inconvenience is low. Since "the detection module 130 fails to detect the degree of inconvenience", it is assumed that the user does not use the target function frequently and therefore the limitation on the use is not inconvenient to the user.

Details of the processing to be performed by the setting module 135 are described later with reference to FIG. 8 to FIG. 11 that illustrate detailed examples.

The trial period adjusting module 140 adjusts the length of the trial period.

When the management objective has a high achievement level, the trial period adjusting module 140 may shorten the trial period. The "achievement level" indicates the degree of achievement of the management objective and is generally represented at multiple stages. For example, when the management objective is "reduction of sheets", the achievement level is represented by "high-level reduction", "medium-level reduction", "low-level reduction", and the like. The "high achievement level" indicates that the achievement is difficult and may be a predetermined achievement level (for example, "high-level reduction" or "medium-level reduction") or an achievement level up to a predetermined place of ranking (for example, an achievement level up to a second place of ranking in a descending order of achievement difficulty).

When the frequency of use of the function limited by setting the authority is low based on a use history of the user, the trial period adjusting module 140 may prolong the trial period. Examples of the case in which "the frequency of use is low" include a case in which the frequency of use is equal to or lower than a predetermined threshold.

When the degree of inconvenience detected by the detection module 130 is high during the trial period, the trial period adjusting module 140 may shorten the trial period. Examples of the case in which "the degree of inconvenience is high" include a case in which the degree of inconvenience is equal to or higher than a predetermined threshold. The case in which "the degree of inconvenience is high" may be a case in which the degrees of inconvenience are high for users in a proportion equal to or higher than a predetermined threshold among the target users. For example, when it is determined that the degree of inconvenience is high, the trial period may be terminated.

Details of the processing to be performed by the trial period adjusting module 140 are described later with reference to FIG. 12 that illustrates a detailed example.

The control module 145 is connected to the trial environment changing processing module 105 and the authority setting processing module 120. The control module 145 controls the modules inside the information processing apparatus 100. Specifically, the control module 145 causes the trial environment changing processing module 105 to create the user interface to be used during the trial period in accordance with an instruction from the user (for example, the administrator). The control module 145 prompts the user (for example, a user other than the administrator) to use the user interface and provides the operation history to the authority setting processing module 120 so as to set the authority for each user.

Figure 2B:
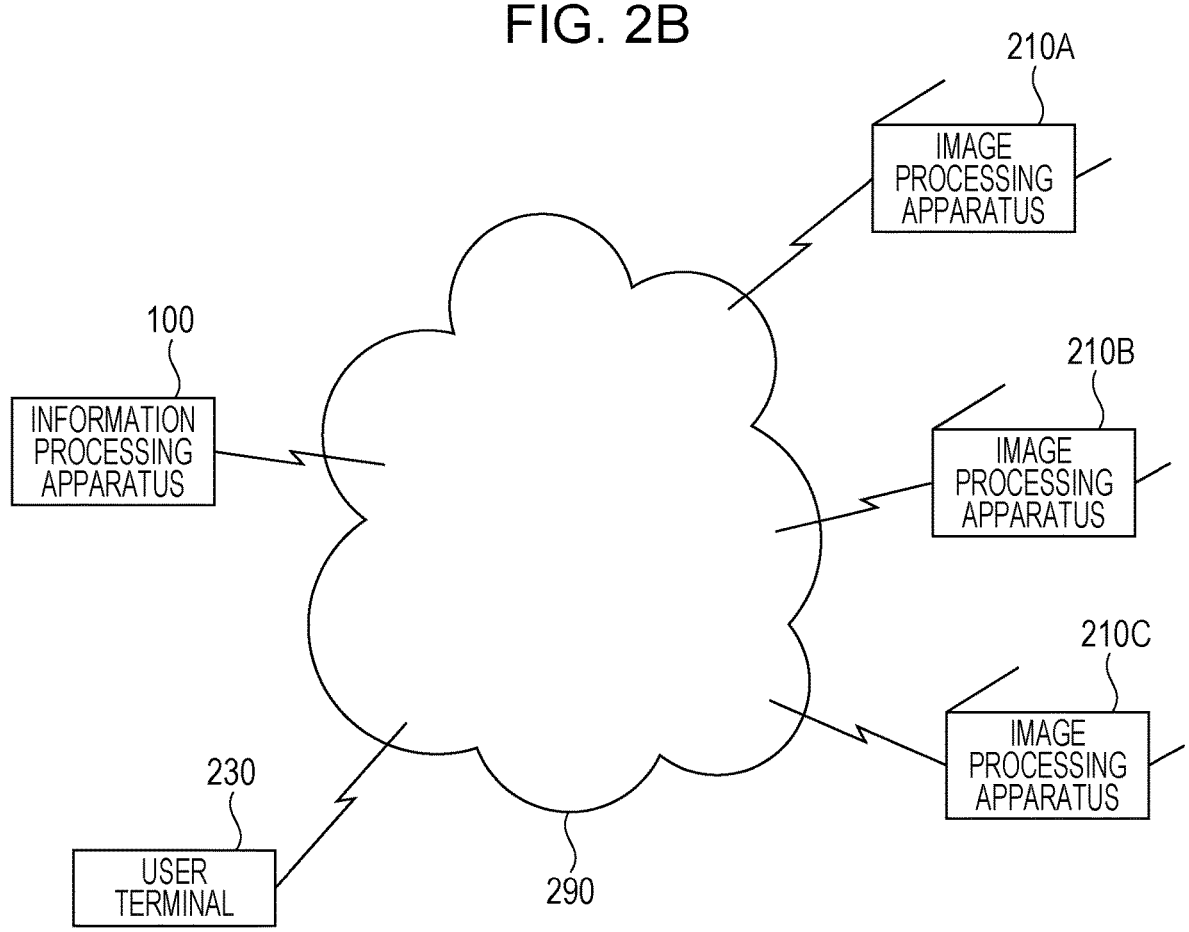

FIGS. 2A and 2B illustrate examples of the system configuration that utilizes this exemplary embodiment.

In the example illustrated in FIG. 2A, an image processing apparatus 210 includes the information processing apparatus 100 and an image processing module 220. Examples of the image processing apparatus 210 include a copying machine, a facsimile machine, a scanner, a printer, and a multifunction peripheral (image processing apparatus having two or more functions of the scanner, the printer, the copying machine, and the facsimile machine). The apparatus including the information processing apparatus 100 is not limited to the image processing apparatus 210 but may be, for example, a personal computer, a portable information communication apparatus (including a mobile phone, a smartphone, a mobile apparatus, and a wearable computer), a home information appliance, or a robot as long as the apparatus is capable of limiting a function and changing a user interface.

The information processing apparatus 100 is connected to the image processing module 220. The image processing module 220 is connected to the information processing apparatus 100. The image processing module 220 provides original functions of the information processing apparatus 100. The functions may be limited by a user. The image processing apparatus 210 is capable of managing authorities of the user.

In the example illustrated in FIG. 2B, the information processing apparatus 100, an image processing apparatus 210A, an image processing apparatus 210B, an image processing apparatus 210C, and a user terminal 230 are connected to each other via a communication network 290. The communication network 290 may be a wireless network, a wired network, or a combination thereof. For example, the communication network 290 may be the Internet or an intranet serving as a communication infrastructure. The functions of the information processing apparatus 100 may be implemented as cloud services.

An administrator operates the user terminal 230 to instruct the information processing apparatus 100 to change an authority. The information processing apparatus 100 changes a user interface of each image processing apparatus 210 and changes the authority of the user in accordance with an operation history during a trial period.

FIG. 3 is a flowchart illustrating an example of processing according to this exemplary embodiment (to be performed by, for example, the trial environment changing processing module 105).

In Step S302, a management objective is received. For example, an objective "reduction of sheets" is specified by an administrator's operation. This processing may be performed periodically in order to follow changes in the user's task.

In Step S304, an achievement level is received. For example, any one of "high-level reduction", "medium-level reduction", and "low-level reduction" is specified by an administrator's operation as an achievement level indicating a desired degree of reduction of sheets.

In Step S306, a trial period is received. For example, one week is specified by an administrator's operation. The trial period may be varied for each user. The trial period may be varied for each image processing apparatus 210.

In Step S308, a target user is received. For example, a user ID (or a user group including multiple users) is specified by an administrator's operation.

In Step S310, a function corresponding to the management objective is extracted. For example, the function corresponding to the management objective is extracted by using a management objective-function correspondence table 400. FIG. 4 illustrates an example of the data structure of the management objective-function correspondence table 400. The management objective-function correspondence table 400 has a management objective field 410 and a function field 420. The management objective field 410 stores management objectives. The function field 420 stores functions for achieving the management objectives. For example, a "multiple-pages collective printing function" (function field 420) is provided as a function corresponding to a management objective "reduction of sheets" (management objective field 410), a "color/monochrome printing setting function" is provided as a function corresponding to a management objective "reduction of color printing", and a "stapling function" is provided as a function corresponding to a management objective "reduction of staples". The "multiple-pages collective printing function" (also referred to as n-up or reduced layout) refers to a function of collectively outputting multiple pages on a single sheet. Thus, this function may achieve reduction of sheets. A function of outputting pages on both sides of a sheet may be associated with "reduction of sheets".

In Step S312, a user interface is changed to a user interface that raises difficulty in using the function in accordance with the function and the achievement level. As a matter of course, a user interface of a target apparatus (in the examples of FIGS. 2A and 2B, the image processing apparatus 210) is changed.

For example, the user interface is changed by using a trial-period user interface table 500. FIG. 5 illustrates an example of the data structure of the trial-period user interface table 500. The trial-period user interface table 500 has a function field 510, an achievement level field 520, and a default user interface field 530. The function field 510 stores functions. The achievement level field 520 stores achievement levels corresponding to the functions. The default user interface field 530 stores default user interfaces corresponding to the functions or the achievement levels. That is, the default user interface field 530 corresponding to the function field 510 or the achievement level field 520 is extracted and the user interface is changed to the user interface in the default user interface field 530.

For example, in a first row of the trial-period user interface table 500, "high-level reduction", "medium-level reduction", and "low-level reduction" (achievement level field 520) are provided as achievement levels corresponding to the "multiple-pages collective printing function" (function field 510). A default user interface "8 pages per sheet" (default user interface field 530) is provided as a default user interface corresponding to the achievement level "high-level reduction" (achievement level field 520), a default user interface "4 pages per sheet" (default user interface field 530) is provided as a default user interface corresponding to the achievement level "medium-level reduction", and a default user interface "2 pages per sheet" (default user interface field 530) is provided as a default user interface corresponding to the achievement level "low-level reduction". For example, when "medium-level reduction" is specified, "4 pages per sheet (4-up)" is displayed for the user as a default user interface. Since this user interface is a default user interface, the user interface may be changed by the user. For example, the user may change the default user interface "4 pages per sheet (4-up)" to "2 pages per sheet (2-up)" or "multiple pages per sheet: OFF (that is, one page is printed on a single sheet)". It is assumed that the user who has changed the default user interface intends to use a different function despite an additional changing operation (example of inconvenience). When the default user interface is changed frequently, it is recognized that the task is hindered in the case of the default user interface ("4 pages per sheet (4-up)").

In a second row of the trial-period user interface table 500, a default user interface "move 'stapling' to bottom of menu display" or "move 'stapling' to 'other settings' item" (default user interface field 530) is provided as a default user interface corresponding to the "stapling function" (function field 510).

The default user interface "move 'stapling' to bottom of menu display" is described with reference to the example of FIGS. 6A and 6B.

The default user interface "move 'stapling' to 'other settings' item" is described with reference to the example of FIGS. 7A to 7C.

The features described above are examples of a measure to indirectly detect inconvenience to a user via an apparatus. As described above, those features correspond to a configuration in which a setting button is arranged at a position where the setting button is not easily found or a configuration in which time and effort are required for an operation.

As described above, the burdensomeness (use difficulty) is raised in the process of setting or selecting the function that is a target of necessity determination and it is predicted that the function is undoubtedly necessary when the user has set or selected the function or intends to set or select the function despite the burdensomeness.

A direct-report button (button to be used by the user for expressing that the system is not user-friendly) may be displayed in advance so as to detect the number of times or frequency at which the direct-report button is depressed. A sound collector such as a microphone having a sound collecting function and a voice recognition module may be provided so as to detect the number of times or frequency at which the sound collector collects sounds of tsking or complaints. The number of times or frequency at which a button of an unusable function is depressed may be detected. Inconvenience to a user may be detected by using those features. Those features are examples of the measure to indirectly detect inconvenience to a user via an apparatus.

Figure 6A:
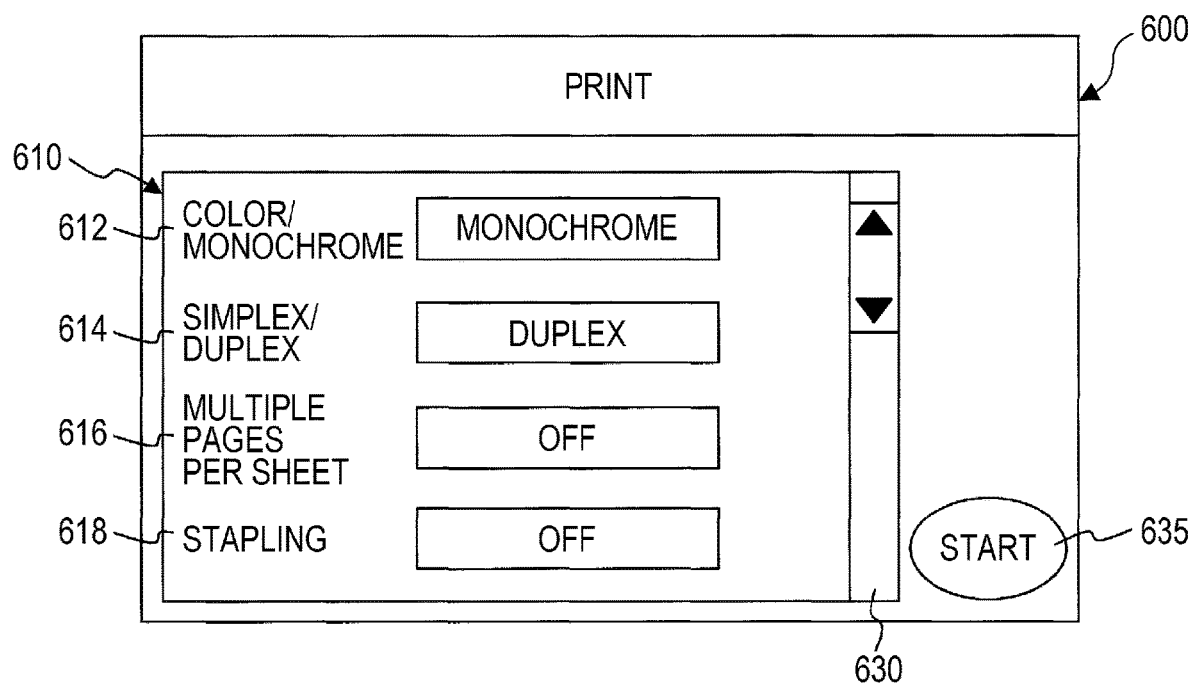
FIGS. 6A and 6B illustrate an example of processing according to this exemplary embodiment.
Figure 6B:
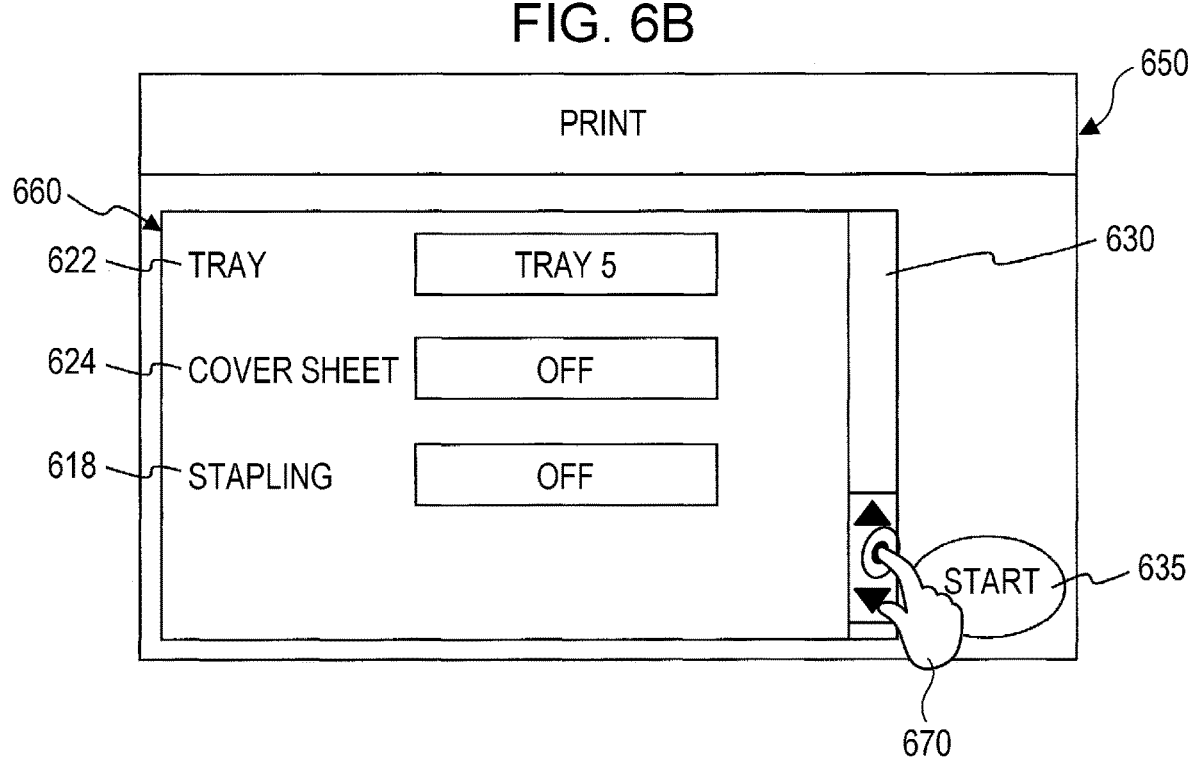

FIGS. 6A and 6B illustrate an example of processing according to this exemplary embodiment. FIGS. 6A and 6B illustrate a user interface for print instruction, which is a display example of a display apparatus such as a liquid crystal display provided in the image processing apparatus 210.

In the example illustrated in FIG. 6A, a setting area 610 and a start button 635 are displayed on a normal UI screen 600. A color/monochrome setting area 612, a simplex/duplex setting area 614, a multiple-pages collective printing setting area 616, a stapling setting area 618, and a scroll bar 630 are displayed in the setting area 610. FIG. 6A illustrates a user interface before the trial period (that is, before the changing to be performed by the operation environment changing module 115). In this user interface, the stapling setting area 618 is displayed at a top part of the setting area 610. That is, an operation (for example, a switching operation from "OFF" to "ON") may be performed in the stapling setting area 618 without operating the scroll bar 630.

The example illustrated in FIG. 6B indicates a state after the user interface is changed by the operation environment changing module 115. A setting area 660 and the start button 635 are displayed on a trial-period UI screen 650. In the setting area 660, the stapling setting area 618 is moved to the bottom of the menu display. That is, when performing an operation in the stapling setting area 618, it is necessary to perform an operation of moving a thumb downward in the scroll bar 630 with a pointer 670. The stapling setting area 618 is moved to a position where the stapling setting area 618 may be viewed by scrolling. As a result of the operation, a tray setting area 622, a cover sheet setting area 624, and the stapling setting area 618 are displayed in the setting area 660. Thus, the use of the stapling setting area 618 becomes a difficult operation compared with the example of FIG. 6A.

Figure 7A:
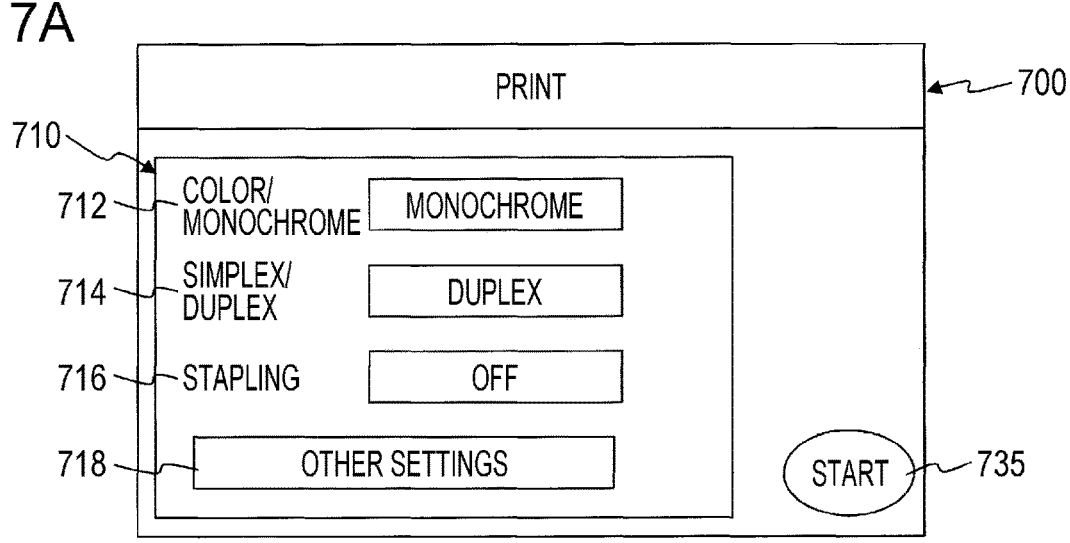
FIGS. 7A to 7C illustrate an example of processing according to this exemplary embodiment.
Figure 7B:
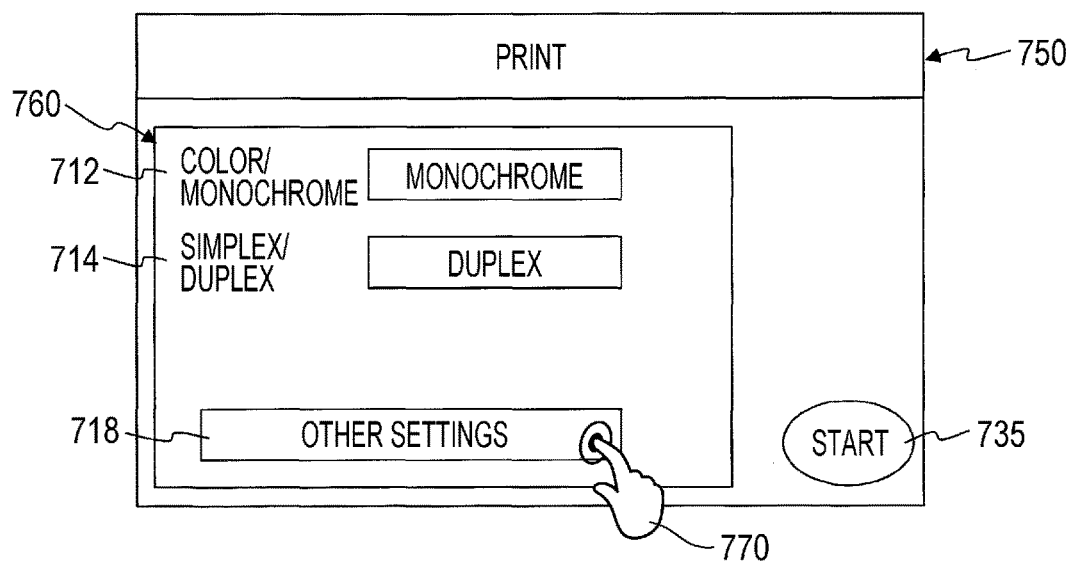
Figure 7C:
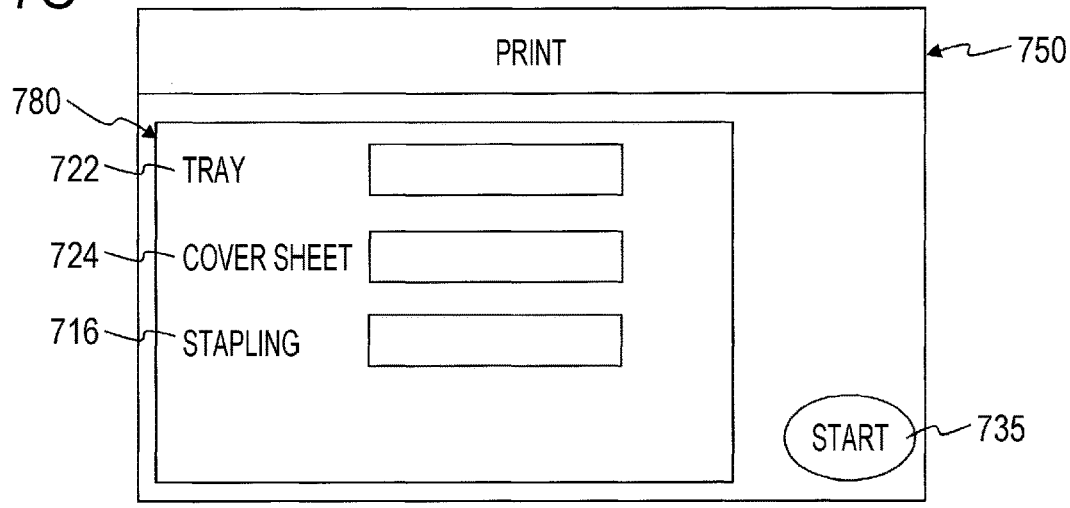

FIGS. 7A to 7C illustrate an example of processing according to this exemplary embodiment. FIGS. 7A to 7C illustrate a user interface for print instruction, which is a display example of the display apparatus such as a liquid crystal display provided in the image processing apparatus 210.

In the example illustrated in FIG. 7A, a setting area 710 and a start button 735 are displayed on a normal UI screen 700. A color/monochrome setting area 712, a simplex/duplex setting area 714, a stapling setting area 716, and an "other settings" button 718 are displayed in the setting area 710. FIG. 7A illustrates a user interface before the trial period (that is, before the changing to be performed by the operation environment changing module 115). In this user interface, the stapling setting area 716 is displayed in a top page of the setting area 710. That is, an operation (for example, a switching operation from "OFF" to "ON") may be performed in the stapling setting area 716 without operating the "other settings" button 718.

The example illustrated in FIG. 7B indicates a state after the user interface is changed by the operation environment changing module 115. A setting area 760 and the start button 735 are displayed on a trial-period UI screen 750. The color/monochrome setting area 712, the simplex/duplex setting area 714, and the "other settings" button 718 are displayed in the setting area 760. That is, in the setting area 760, the stapling setting area 716 is removed from the setting area 710 and is displayed when the "other settings" button 718 is selected with a pointer 770. Specifically, this state is indicated by the example illustrated in FIG. 7C. A setting area 780 and the start button 735 are displayed on the trial-period UI screen 750. A tray setting area 722, a cover sheet setting area 724, and the stapling setting area 716 are displayed in the setting area 780. That is, when performing an operation in the stapling setting area 716, it is necessary to perform an operation of selecting the "other settings" button 718. The stapling setting area 716 is hidden in a deep part of a function layer (layer of the user interface). Thus, the use of the stapling setting area 716 becomes a difficult operation compared with the example of FIG. 7A.

Figure 8:
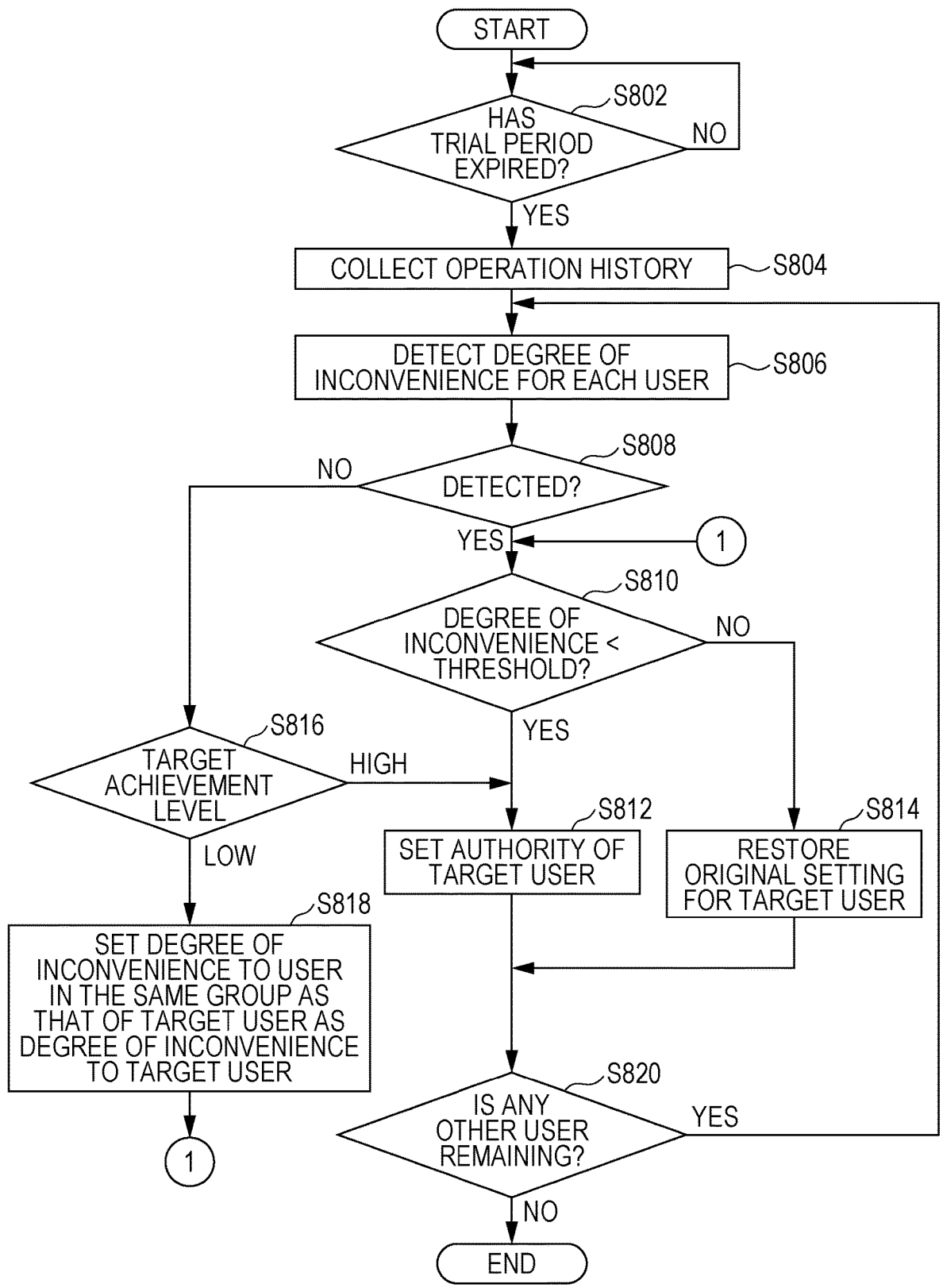
FIG. 8 is a flowchart illustrating an example of processing according to this exemplary embodiment.

FIG. 8 is a flowchart illustrating an example of processing according to this exemplary embodiment (to be performed by, for example, the authority setting processing module 120).

In Step S802, it is determined whether the trial period has expired. When the trial period has expired, the processing proceeds to Step S804. When the trial period has not expired, the processing waits until the trial period expires. This processing may be performed periodically in order to follow changes in the user's task.

In Step S804, an operation history is collected. Specifically, an operation history in the trial period is collected from the apparatus (in the examples of FIGS. 2A and 2B, the image processing apparatus 210) whose user interface is changed by the processing of the flowchart illustrated in the example of FIG. 3. For example, an operation history table 900 is collected. FIG. 9 illustrates an example of the data structure of the operation history table 900. The operation history table 900 has a log ID field 910, an operation date and time field 920, a user ID field 930, and an operation field 940. The log ID field 910 stores information for uniquely identifying logs (log identifications (IDs)) in this exemplary embodiment. The operation date and time field 920 stores operation dates and times (in the format of a day, a month, a year, an hour, a minute, a second, a time smaller than the second, or combinations thereof). The user ID field 930 stores information for uniquely identifying users (user IDs) in this exemplary embodiment. The operation field 940 stores operations.

As described above, the operation history may include the number of times or frequency at which the direct-report button is depressed. The operation history may include the number of times or frequency at which the sound collector collects sounds of tsking or complaints. The operation history may include the number of times or frequency at which a button of an unusable function is depressed.

In the example of FIG. 9, a log having a log ID "12345" indicates that a user having a user ID "FX0001" specified a stapling operation on an operation date and time "May 17, 2017 10:00:00". A log having a log ID "12346" indicates that the user having the user ID "FX0001" specified a copying operation on an operation date and time "May 17, 2017 10:00:10". That is, the user having the user ID "FX0001" specified stapling despite the user interface illustrated in the example of FIGS. 6A and 6B or FIGS. 7A to 7C.

In Step S806, the degree of inconvenience is detected for each user. For example, an inconvenience degree table 1000 is generated. FIG. 10 illustrates an example of the data structure of the inconvenience degree table 1000. The inconvenience degree table 1000 has a user ID field 1010 and an inconvenience degree field 1020. The user ID field 1010 stores user IDs. The inconvenience degree field 1020 stores degrees of inconvenience to users having those user IDs.

In the example of FIG. 10, the degree of inconvenience to the user having the user ID "FX0001" is 1/5. This degree of inconvenience has a denominator indicating the trial period (for example, five days) and a numerator indicating the number of times of use. The degree of inconvenience is not limited thereto but may simply be a value indicating the number of times of use, may have a denominator indicating the number of times the image processing apparatus 210 is used, or may be a value multiplied by a weighting factor for each user.

When the number of operations performed on the image processing apparatus 210 is small or when the number of target operations is small (for example, when the number of stapling operations is equal to or smaller than a predetermined threshold), the degree of inconvenience is not calculated (it is determined that the detection of the degree of inconvenience results in failure) because the number of samples is small and insufficient to determine whether to change the authority.

In Step S808, it is determined whether the degree of inconvenience is detected. When the degree of inconvenience is detected, the processing proceeds to Step S810. When the degree of inconvenience is not detected, the processing proceeds to Step S816.

In Step S810, it is determined whether "degree of inconvenience<threshold" is satisfied. When "degree of inconvenience<threshold" is satisfied (when the user interface is not inconvenient after the change), the processing proceeds to Step S812. When "degree of inconvenience<threshold" is not satisfied (when the user interface is inconvenient after the change), the processing proceeds to Step S814.

In Step S812, the authority of the target user is set. That is, the authority of the target user is set so that the use of the target function is disabled or becomes a difficult operation (the user interface during the trial period is used as it is). This operation increases the possibility that the management objective may be achieved without hindering the task.

In Step S814, the original setting is restored for the target user. That is, the authority of the target user is not changed. The user interface is restored to the state before the trial period. This operation may prevent hindrance to the task of the target user.

When the target achievement level is "low" in Step S816, the processing proceeds to Step S818. When the target achievement level is "high", the processing proceeds to Step S812. The reason why the processing proceeds to Step S818 when the target achievement level is "low" is that the same task may be assigned in the same group (organization) and it is therefore appropriate to set the same authority as that of a group member. The reason why the processing proceeds to Step S812 when the target achievement level is "high" is that the likelihood of use of the function is low due to the small number of samples and it is therefore appropriate to make a contribution to achievement of the management objective.

In Step S818, the degree of inconvenience to a user who belongs to the same group as that of the target user is set as the degree of inconvenience to the target user. Then, the processing proceeds to Step S810. For example, a user table 1100 is used. FIG. 11 illustrates an example of the data structure of the user table 1100. The user table 1100 has a user ID field 1110, a user name field 1120, and a group field 1130. The user ID field 1110 stores user IDs. The user name field 1120 stores user names of users having those user IDs. The group field 1130 stores groups to which the users having those user IDs belong. A user in the same group as that of the target user is extracted by using the user table 1100 and the degree of inconvenience to the extracted user is extracted by using the information processing apparatus 100, thereby performing the determination processing of Step S810.

In Step S820, it is determined whether any other user is remaining. When any other user is remaining, the processing returns to Step S806. When no other user is remaining (when all the users have become targets), the processing is terminated.

Figure 12:
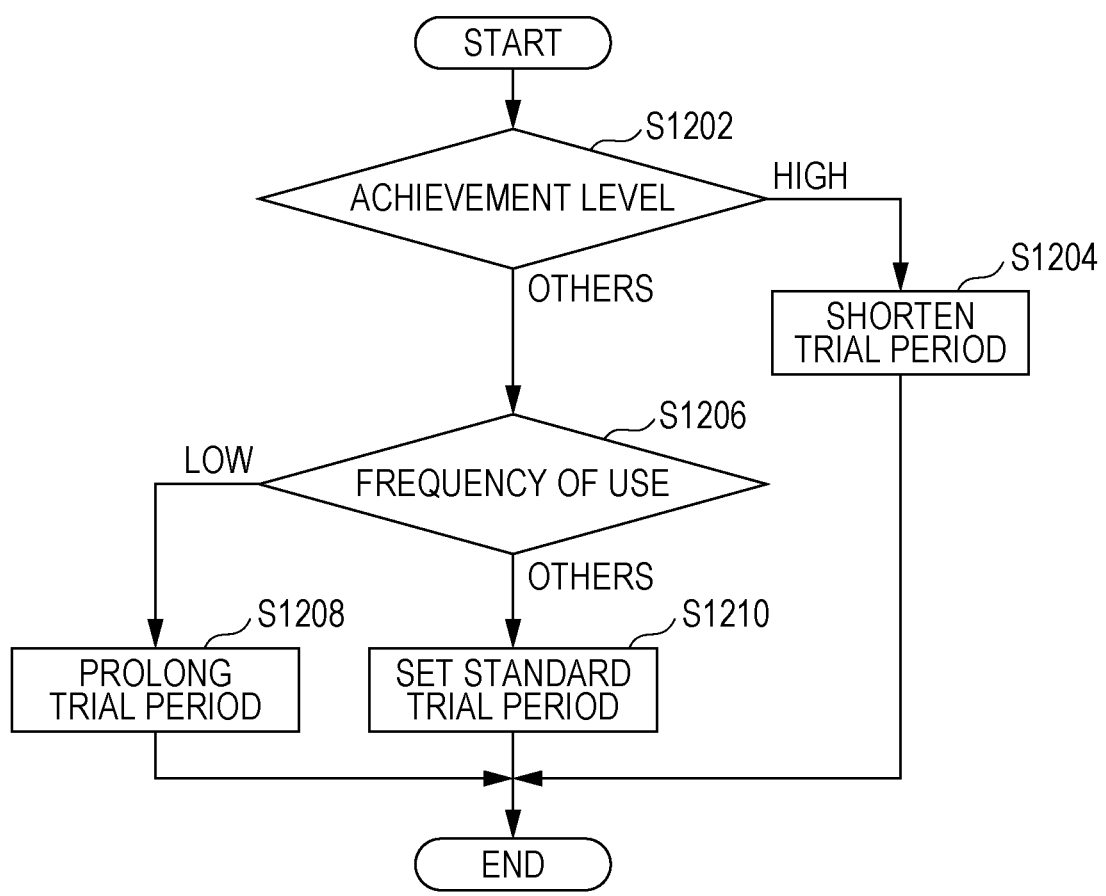
FIG. 12 is a flowchart illustrating an example of processing according to this exemplary embodiment.

FIG. 12 is a flowchart illustrating an example of processing according to this exemplary embodiment (to be performed by, for example, the trial period adjusting module 140).

When the achievement level is "high" in Step S1202, the processing proceeds to Step S1204. When the achievement level is "others", the processing proceeds to Step S1206. When the achievement level is "high", it is appropriate to facilitate achievement of the management objective by limiting the authority promptly or to shorten the trial period for a user whose task may be hindered.

In Step S1204, the trial period set by the administrator is shortened and the processing is terminated. For example, a predetermined period may be subtracted from the trial period or the trial period may be multiplied by a predetermined coefficient (value smaller than 1).

When the frequency of use is "low" in Step S1206, the processing proceeds to Step S1208. When the frequency of use is "others", the processing proceeds to Step S1210. It is only necessary to determine whether the frequency of use is "low" by referring to the operation history.

In Step S1208, the trial period is prolonged in order to increase the number of samples.

In Step S1210, a standard trial period is set.

The trial period may be adjusted dynamically. That is, the trial period may be adjusted during the trial period.

An example of the hardware configuration of the information processing apparatus of this exemplary embodiment is described with reference to FIG. 13. For example, the configuration illustrated in FIG. 13 is implemented by a personal computer (PC). FIG. 13 illustrates an example of the hardware configuration including a data reading part 1317 such as a scanner and a data output part 1318 such as a printer.

A central processing unit (CPU) 1301 is a controller that executes processing in accordance with computer programs describing execution sequences of various modules described above in the exemplary embodiment, that is, the trial environment changing processing module 105, the reception module 110, the operation environment changing module 115, the authority setting processing module 120, the operation history collecting module 125, the detection module 130, the setting module 135, the trial period adjusting module 140, and the control module 145.

A read only memory (ROM) 1302 stores the programs and operational parameters to be used by the CPU 1301. A random access memory (RAM) 1303 stores programs to be used for execution of the CPU 1301 and parameters that change as appropriate in the execution. Those components are connected to each other by a host bus 1304 that is a CPU bus or the like.

The host bus 1304 is connected to an external bus 1306 such as a peripheral component interconnect/interface (PCI) bus via a bridge 1305.

A keyboard 1308 and a pointing device 1309 such as a mouse are devices to be operated by an operator. A display 1310 is typified by a liquid crystal display apparatus and a cathode ray tube (CRT) and displays various kinds of information as text or image information. There may be employed a touchscreen or the like that has functions of both of the pointing device 1309 and the display 1310. In this case, the function of the keyboard may be implemented by rendering a keyboard on a screen (touchscreen) by software (referred to also as a software keyboard or a screen keyboard) without physical connection as in the case of the keyboard 1308.

A hard disk drive (HDD) 1311 includes hard disks (may be a flash memory or the like) and drives the hard disks to record or reproduce information or programs to be executed by the CPU 1301. The hard disks store the management objective-function correspondence table 400, the trial-period user interface table 500, the operation history table 900, the inconvenience degree table 1000, and the user table 1100. The hard disks also store various other kinds of data and computer programs.

A drive 1312 reads data or programs recorded in a removable recording medium 1313 inserted thereto, such as a magnetic disk, an optical disc, a magneto-optical disk, or a semiconductor memory, and supplies the data or programs to the RAM 1303 connected via an interface 1307, the external bus 1306, the bridge 1305, and the host bus 1304. The removable recording medium 1313 may also be used as a data recording area.

A connection port 1314 is a port that connects an external connection device 1315 and has connectors for USB, IEEE 1394, and the like. The connection port 1314 is connected to the CPU 1301 and the like via the interface 1307, the external bus 1306, the bridge 1305, the host bus 1304, and the like. A communication part 1316 is connected to a communication network and executes external data communication processing. For example, the data reading part 1317 is a scanner and executes document reading processing. For example, the data output part 1318 is a printer and executes document data output processing.

The hardware configuration of the information processing apparatus illustrated in FIG. 13 is one configuration example and this exemplary embodiment is not limited to the configuration illustrated in FIG. 13 as long as the modules described in this exemplary embodiment may be executed. For example, some of the modules may be implemented by dedicated hardware (such as an application specific integrated circuit (ASIC)). Some of the modules may be located in an external system and connected via a communication network. Multiple systems illustrated in FIG. 13 may be connected to each other via a communication network and operate in cooperation. In particular, the system may be embedded not only in a personal computer but also in a portable information communication apparatus (including a mobile phone, a smartphone, a mobile apparatus, and a wearable computer), a home information appliance, a robot, a copying machine, a facsimile machine, a scanner, a printer, and a multifunction peripheral.

In the exemplary embodiment described above, the trial period is provided and whether the user recognizes inconvenience is investigated within a range of the trial period. The exemplary embodiment is not limited to the provision of the trial period but the investigation may be conducted periodically. For example, determination may be made on the degree of inconvenience periodically on a monthly basis to change the authority. The exemplary embodiment is not limited to the periodical investigation but irregular investigation may be employed. For example, the investigation may be conducted in accordance with an instruction from a user such as an administrator.

In the comparison processing described above in the exemplary embodiment, the expressions "equal to or larger (higher) than", "equal to or smaller (lower) than", "larger (higher) than", and "smaller (lower) than" may respectively indicate "larger (higher) than", "smaller (lower) than", "equal to or larger (higher) than", and "equal to or smaller (lower) than" unless any inconsistency occurs in the combinations.

The program described above may be provided while being stored in a recording medium or may be provided by a communication medium. In this case, for example, the program described above may be understood as a "non-transitory computer readable medium storing a program".

The "non-transitory computer readable medium storing a program" refers to a non-transitory computer readable medium that stores a program and is used for installing, executing, or distributing the program.

Examples of the recording medium include digital versatile discs (DVDs) such as "DVD-R", "DVD-RW", and "DVD-RAM" that are standards developed by the DVD Forum and "DVD+R" and "DVD+RW" that are standards developed by the DVD+RW Alliance, compact discs (CDs) such as CD-Read Only Memory (CD-ROM), CD-Recordable (CD-R), and CD-ReWritable (CD-RW), Blu-ray (registered trademark) discs, magneto-optical disks (MOs), flexible disks (FDs), magnetic tapes, hard disks, read only memories (ROMs), electrically erasable programmable read only memories (EEPROMs (registered trademark)), flash memories, random access memories (RAMs), and secure digital (SD) memory cards.

The whole or a part of the program described above may be stored or distributed while being recorded in the recording medium. The program may be transmitted by communications via transmission media such as a wired network, a wireless communication network, and a combination thereof, which are used in, for example, a local area network (LAN), a metropolitan area network (MAN), a wide area network (WAN), the Internet, an intranet, and an extranet. The program may be carried on a carrier wave.

The program described above may be a part or the whole of a different program or may be recorded in a recording medium together with a separate program. The program may be recorded separately in multiple recording media. The program may be recorded in any format such as a compressed or encrypted format as long as the program is reconstructible.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a hardware processor programmed to:
increase a difficulty level required for a user to perform an operation of the information processing apparatus for a predetermined temporary trial period;
then detect the user's activity relating to the operation during the predetermined temporary trial period;
set an authority level of the user with respect to the operation based on at least the detected activity during the predetermined temporary trial period; and
after the predetermined temporary trial period, restoring the difficulty level required to perform the operation to a state before the predetermined temporary trial period.

2. The information processing apparatus according to claim 1,
wherein, the operation is using a function of the information processing apparatus that is limited depending on the authority level of the user, and wherein the processor is programmed to:
detect a degree of inconvenience to the user based on the user's performance of the operation during the predetermined temporary trial period; and
set the authority level of the user after the predetermined temporary trial period has expired.

3. The information processing apparatus according to claim 2, wherein the operation made more difficult by requiring more operation steps to use the function or by making it more difficult to find an element corresponding to the function than in a state before the predetermined temporary trial period.

4. The information processing apparatus according to claim 2, wherein the processor is programmed to:
adjust a length of the predetermined temporary trial period.

5. The information processing apparatus according to claim 4, wherein the processor is programmed to:
shorten the predetermined temporary trial period when a management objective relating to the function is set to a high target achievement level.

6. The information processing apparatus according to claim 4,
wherein the processor is programmed to:
prolong the predetermined temporary trial period when a frequency of use of the function is low based on a use history of the user.

7. The information processing apparatus according to claim 4,
wherein the processor is programmed to:
shorten the predetermined temporary trial period when a high degree of inconvenience is detected.

8. The information processing apparatus according to claim 1,
wherein the processor is programmed to:
set the authority level of the user so that use of a function of the information processing apparatus is disabled or becomes more difficult by setting a user interface.

9. The information processing apparatus according to claim 8,
wherein the processor is programmed to:
set the authority level of the user so that the use of the function is disabled or becomes more difficult when a detected degree of inconvenience to the user in performing the function is low.

10. The information processing apparatus according to claim 8,
wherein the processor is programmed to:
prohibit changing the authority level of the user when a detected degree of inconvenience to the user in performing the function is high.

11. The information processing apparatus according to claim 8,
wherein the processor is programmed to:
set the authority level of the user based on a degree of inconvenience to another user who belongs to an organization identical to an organization of the user when a degree of inconvenience of the user in performing the function cannot be detected and a management objective relating to the function is set to a low target achievement level.

12. The information processing apparatus according to claim 8,
wherein the processor is programmed to:
set the authority level of the user by assuming that a degree of inconvenience of the user in performing the function is low if the degree of inconvenience cannot be detected and a management objective relating to the function is set to a high target achievement level.

13. A non-transitory computer readable medium storing an information processing program causing a computer to execute a process comprising:
increasing a difficulty level required for a user to perform an operation of the information processing apparatus for a predetermined temporary trial period;
then detecting the user's activity relating to the operation during the predetermined temporary trial period;
setting an authority level of the user with respect to the operation based on at least the detected activity during the predetermined temporary trial period; and
after the predetermined temporary trial period, restoring the difficulty level required to perform the operation to a state before the predetermined temporary trial period.

* * * * *